(12) United States Patent
Halén et al.

(10) Patent No.: US 8,732,327 B2
(45) Date of Patent: May 20, 2014

(54) METHODS AND ARRANGEMENTS FOR SYSTEM PROVIDING MEDIA VIA MULTICAST DISTRIBUTION

(75) Inventors: Joacim Halén, Sollentuna (SE); Victor Souza, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 147 days.

(21) Appl. No.: 13/201,613

(22) PCT Filed: Nov. 23, 2009

(86) PCT No.: PCT/SE2009/051320
§ 371 (c)(1),
(2), (4) Date: Aug. 15, 2011

(87) PCT Pub. No.: WO2010/114451
PCT Pub. Date: Oct. 7, 2010

(65) Prior Publication Data
US 2011/0302604 A1   Dec. 8, 2011

Related U.S. Application Data

(60) Provisional application No. 61/165,113, filed on Mar. 31, 2009.

(51) Int. Cl.
*G06F 15/16* (2006.01)
*G06F 15/173* (2006.01)
*H04N 5/50* (2006.01)
*H04H 20/71* (2008.01)
*H04L 12/28* (2006.01)
*H04J 3/26* (2006.01)

(52) U.S. Cl.
USPC ........... 709/231; 709/235; 709/223; 709/224; 348/570; 348/731; 370/312; 370/390; 370/432

(58) Field of Classification Search
USPC ............... 725/38, 61; 348/570, 731; 709/231, 709/235, 223, 224; 370/312, 390, 432
See application file for complete search history.

(56) References Cited

U.S. PATENT DOCUMENTS 7,562,375 B2 * 7/2009 Barrett et al. .................... 725/38
2005/0081244 A1 * 4/2005 Barrett et al. .................... 725/97
(Continued)

FOREIGN PATENT DOCUMENTS

| EP | 1523190 A1 | 4/2005 |
|---|---|---|
| EP | 2144402 A1 | 1/2010 |

(Continued)

OTHER PUBLICATIONS

International Search Report, PCT Application No. PCT/SE2009/051320, Nov. 23, 2009 (5 pages).

(Continued)

*Primary Examiner* — Hoang-Vu A Nguyen-Ba
(74) *Attorney, Agent, or Firm* — Myers Bigel Sibley & Sajovec, P.A.

(57) ABSTRACT

The present invention relates to a server and a method for achieving a fast channel change in e.g. an IPTV system. This is achieved by selecting a source for retrieving the requested channel based on the current load of the FCC server. The source may be the streaming server providing the regular multicast stream or a buffer providing a buffered version of the requested channel. According to one embodiment requests for fast channel change (relating to the same channel) are grouped and served and served as a bundle over multicast. By doing that one can alleviate the load on the FCC server and the network since multiple clients can share the same stream.

6 Claims, 9 Drawing Sheets

(56) References Cited

U.S. PATENT DOCUMENTS

| | | |
|---|---|---|
| 2007/0107026 A1 | 5/2007 | Sherer et al. |
| 2007/0177632 A1 | 8/2007 | Oz et al. |
| 2007/0192812 A1* | 8/2007 | Pickens et al. .................. 725/94 |
| 2007/0283397 A1* | 12/2007 | Scholl ............................. 725/86 |
| 2008/0109557 A1* | 5/2008 | Joshi et al. .................... 709/231 |
| 2009/0031342 A1* | 1/2009 | VerSteeg et al. ................ 725/38 |
| 2010/0115566 A1 | 5/2010 | Haimi-Cohen |

FOREIGN PATENT DOCUMENTS

| | | |
|---|---|---|
| WO | WO 0103373 A1 | 1/2001 |
| WO | WO 2009/035200 A1 | 3/2003 |

OTHER PUBLICATIONS

Written Opinion of the International Searching Authority, PCT Application No. PCT/SE2009/051320, Nov. 23, 2009 (9 pages).

* cited by examiner

METHODS AND ARRANGEMENTS FOR SYSTEM PROVIDING MEDIA VIA MULTICAST DISTRIBUTION

CROSS REFERENCE TO RELATED APPLICATION

This application is a 35 U.S.C. §371 national stage application of PCT International Application No, PCT/SE2009/051320, filed on 23 Nov. 2009, which itself claims priority to U.S. Provisional Patent Application No. 61/165,113, filed 31 Mar. 2009, the disclosure and content of both of which are incorporated by reference herein in their entirety. The above-referenced PCT International Application was published in the English language as International Publication No, WO 2010/114451 A1 on 7 Oct. 2010.

TECHNICAL FIELD

The present invention relates to provisioning of media via multicast distribution, and in particular it relates to methods and arrangements for scalable fast channel change.

BACKGROUND

IPTV solutions of today suffer from long channel switching times, that is, it takes a long time from the moment an end user initiate a channel change on the remote unit until sound and picture of the selected channel is present on the TV screen. There are many sources to this delay, but the main source is the encoding techniques used to get a balance between picture quality and the bandwidth required.

The most commonly used encoding techniques are MPEG2 and MPEG4. Both of these techniques use an encoding scheme where the encoder at regular intervals sends a complete picture called an I-frame and in between these I-frames it sends two types, called B- and P-frames, of incomplete pictures describing how the picture changes over time relative to the I-frame. The P and B frames cannot be decoded without the corresponding I-frame. As I-frames contain a lot of information requiring a lot of bandwidth to send, a longer interval between I-frames gives a lower overall bandwidth requirement. However, the decoder in the TV or set-top box cannot start decoding until it receives an I-frame, thus increased I-frame interval (called GOP-length (Group of Picture length)) results in a longer average decoding delay. Statistically this delay will be on average a half of the GOP-length. The encoded content is usually sent as a multicast stream allowing many users to share the same stream thereby saving bandwidth in the access network.

In prior art solutions, e.g. as described in US 2005/0081244 A1, the delay is decreased by creating a buffering node, called VQE (Video Quality Experience) server. This VQE server acquires packets from all available multicast channels and maintains separate cyclic buffers for each channel, holding all packets from the last N seconds. The buffered channels always start with an I-frame. Upon a channel change request, a unicast stream will be sent to the client out of that buffer of the VQE server containing appropriate metadata and an I-frame of the requested channel. As soon as the decoder in the client receives the I-frame in the unicast stream from the buffer of the VQE server it will start buffering and decoding the content. Since the channels are buffered in the VQE server, the timing of the channels is behind the timing of the regular multicast streams. Hence, this unicast stream will be sent to the client until the unicast stream has caught up with the regular multicast stream. When the unicast stream has caught up with the regular multicast stream, the client will terminate the unicast connection and start receiving content from the regular multicast stream.

The major problem with the prior art solutions is the lack of scalability in bandwidth and served requests per second. As each client request leads to one unicast stream sent from the VQE server, the number of simultaneous requests that can be served is severely limited by the available bandwidth in the access network, with the main bottleneck being the available bandwidth on the outgoing port of the VQE server.

Another related issue with the solution above is the lack of graceful degradation, that is, in high load conditions new requests will be denied resulting in that no fast channel change will be provided giving a really poor end user experience. One possible way to fix this is to add more hardware, for example, by adding more VQE servers. Unfortunately this solution is not always affordable.

SUMMARY

The object with the present invention is to provide a scalable fast channel change solution e.g. for an IPTV system.

This is achieved by embodiments of the present invention by selecting the source from which the requested channel is retrieved based on the current load of the FCC server. As an example, the requested channel may either be retrieved from a streaming server providing the regular multicast stream or a buffer of the FCC server providing a buffered version of the requested channel, wherein the buffered version may be a transcoded and time delayed version of the original stream of the streaming server.

According to one embodiment requests for fast channel change (relating to the same channel) are grouped and served as a bundle over multicast. By doing that one can alleviate the load on the FCC server and the network since multiple clients can share the same stream.

Hence, according to a first aspect of the present invention a method in a FCC server is provided. The FCC server handles channel change of channels distributing media transmitted via multicast distribution from a streaming server. In the method a request for a channel change from a client from a first channel to a second channel is received. A load associated with the FCC server is determined and a source for retrieving the second channel based on the determined load is determined. Accordingly, a reply message is sent to retrieve the second channel from the selected source.

According to a second aspect of the present invention a FCC server is provided. The FCC server comprises a receiver for receiving a request for a channel change from a client from a first channel to a second channel and a processor for determining a load associated with the FCC server and for selecting a source for retrieving the second channel based on the determined load. A transmitter is also included to send a reply message to retrieve the second channel from the selected source.

According a third aspect of the present invention, a method in a client of an IPTV network is provided. The client requests a channel change of channels distributing media transmitted via multicast distribution from a streaming server. In the method, a request for a channel change from a first channel to a second channel is sent to a FCC server. A reply message is received from the FCC server, and the reply message is interpreted such that the client is able to receive information of the source where to receive the requested second channel. The source is selected by the FCC server in dependence of the load.

According to a fourth aspect of the present invention, a client of an IPTV network is provided. The client requests a channel change of channels distributing media transmitted via multicast distribution from a streaming server and comprises accordingly a transmitter for sending a request for a channel change from a first channel to a second channel to a FCC server. Moreover, a receiver for receiving a reply message from the FCC server is provided. A processing unit is configured for interpreting the reply message to be able to receive information of the source where to receive the requested second channel, wherein the source is selected by the FCC server in dependence of the load.

At low load a system based on the invention will respond as fast as current existing solutions.

At higher load a system based on the invention will preserve bandwidth by introducing a small delay grouping requests together. The introduced delay will be significantly shorter than the average delay given by the GOP length and the system will hence provide improved performance compared with the prior art solutions.

In the worst case, i.e. at very high load, a system based on the invention will behave as it does not include the present invention, that is, the channel switching time will be the same as in a system that does not have a FCC server. An example of such a situation is an extreme flash crowd of channel change requests.

An advantage with embodiments of the present invention is that the bandwidth requirement scales very well. The bandwidth requirement will increase with increased load up to a preconfigured threshold. If the load passes that threshold, the bandwidth requirement will decrease with increasing load and there will be only one multicast stream at the highest load (e.g. at flash crowds, i.e. a large number of people suddenly changing to the same channel at the same time).

Accordingly, a system based on the embodiments of the present invention will provide graceful degradation. The channel switching time will slowly increase with increasing load on the system but it will never be longer than the longest time in a system without the invention. Furthermore, all clients will be served within that time.

DETAILED DESCRIPTION

Figure 1A:
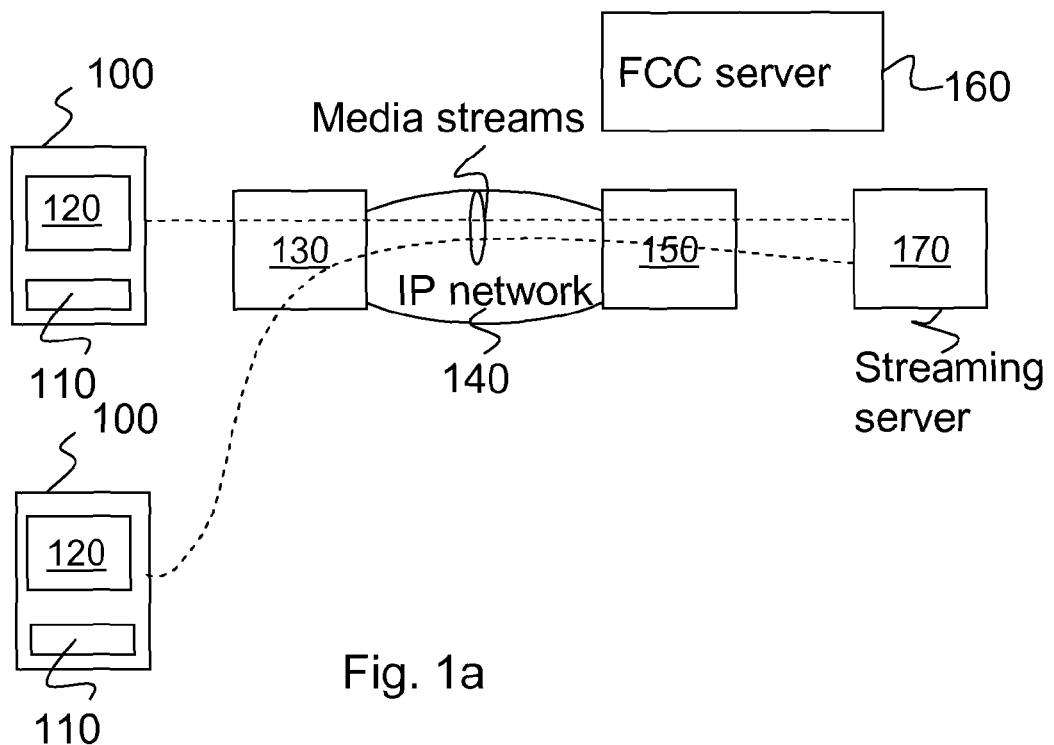
FIGS. 1a-1c illustrates an IPTV system wherein embodiments of the present invention are implemented.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Throughout the description the embodiments are explained in the context of an IPTV system. However, the present invention is not limited to IPTV but can also be applied on all embodiments were a set of clients requests subsets of large amounts of data out of a set of data from a server. One example of such a system is the delivery of operating system patches.

Turning now to FIG. 1a, schematically illustrating an IPTV system wherein the present invention may be implemented. A client 100 is connected to an IP network 140 via an access node 130. The client 100 may comprise a set-top-box 120 and a Residential Gateway or Home Gateway 110. The IP network comprises e.g. a plurality of routers and from an edge router 150, a streaming server 170, providing the media content (e.g. a plurality of TV channels), is connected to the IP network 140. In addition to the streaming server, an additional fast channel change (FCC) server 160 is connected to the IP network, e.g. via the edge router. The FCC server 160 manages channel change requests and is also associated with a buffer for buffering the media streams, e.g. TV channels transmitted via regular multicasting. Since the media streams are buffered, the timing of the media streams stored in the buffer may be behind the timing of media streams of the regular multicast streams. The client decoding buffer should be filled up by the FCC server with a rate faster than the rate of the media streams transmitted with regular multicasting from the streaming server. In addition, each buffered media stream starts with an I-frame to enable faster decoding. The streaming server may be located at a content provider. The media stream of a TV channel is provided to the client via the routers 150 of the IP network 140 and the access node 130 by multicast distribution. This multicast distribution is referred to as regular multicast distribution.

Figure 4:
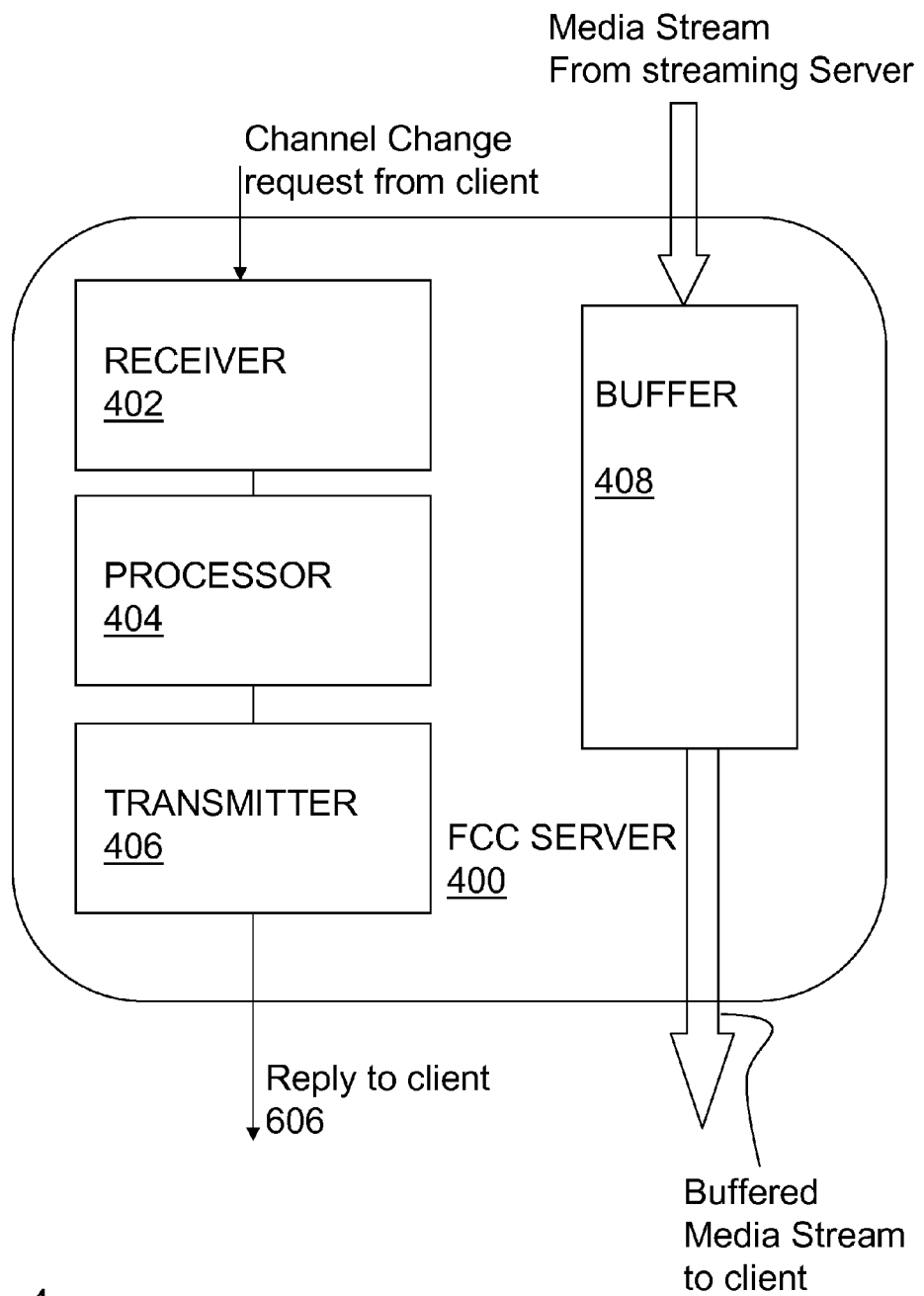
FIG. 4 illustrates the arrangement according to embodiments of the present invention.

According to embodiments of the present invention as illustrated in FIG. 4, the FCC 400 comprises a receiver 402 for receiving a request for a channel change from a transmitter of a client from a first channel to a second channel. A processor 404 of the FCC server is configured to evaluate the request and to determine a load associated with the FCC server. Based on the determined load, the processor 404 selects a source and delivery mechanism (unicast or multicast) for retrieving the second channel. I.e. the FCC server will reply to a receiver of the client with a message containing an address from where the client can retrieve the requested channel. The load may be determined based on the number of current requests being served by the FCC server or on the available bandwidth of the FCC server. Moreover, the source may be buffer 408 of the FCC server or e.g. the streaming server providing the regular multicast stream. The FCC server comprises further a transmitter 406 for replying to the client to retrieve the second channel from the selected source.

Figure 6:
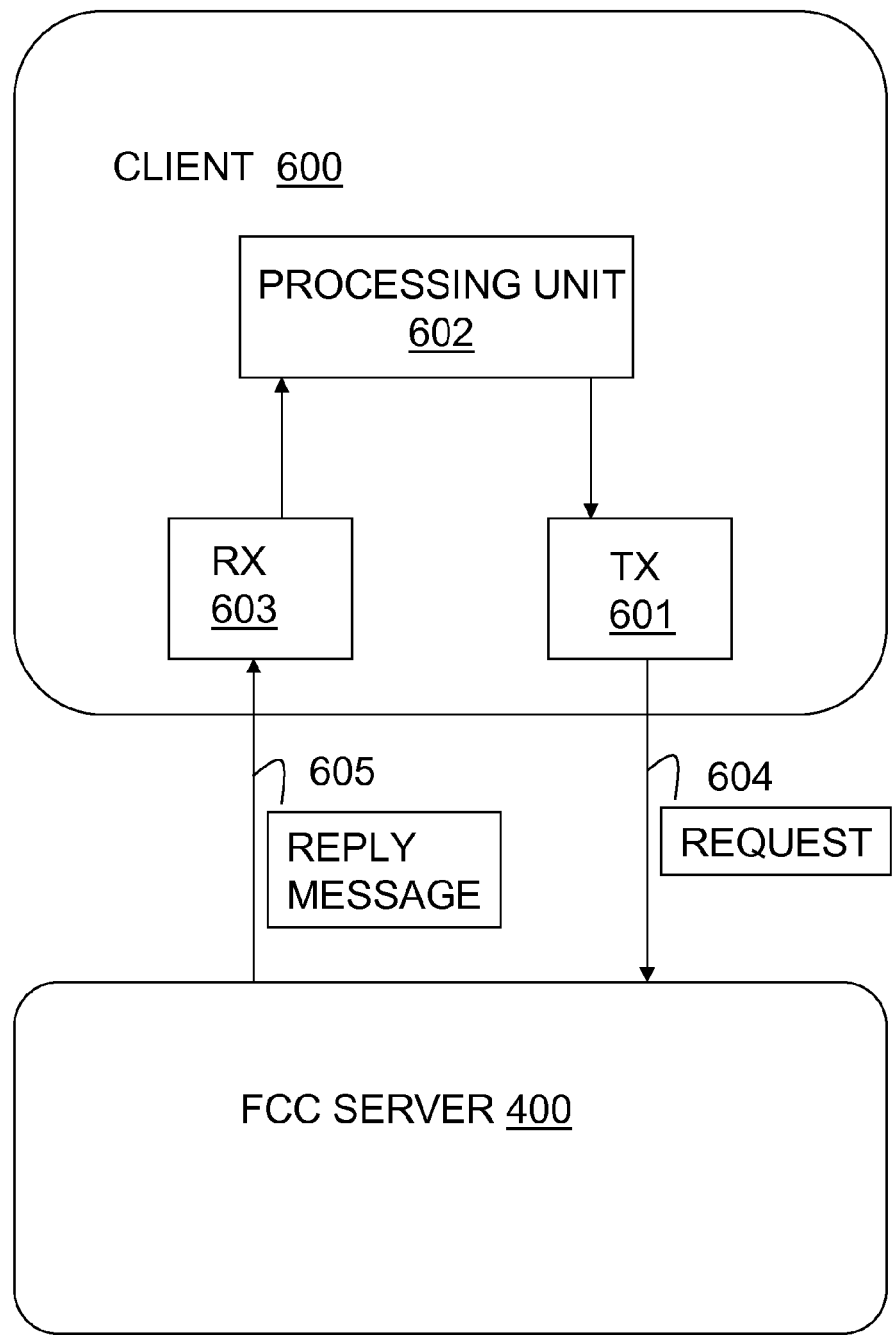
FIG. 6 illustrates schematically the client according to embodiments of the present invention.

Accordingly, as illustrated in FIG. 6, the client 600 comprises a transmitter 601 for sending a request 604 for a channel change from a first channel to a second channel to the FCC server. As an alternative, this request 604 may also flag up to the FCC server that this client can receive redirect commands. Further, the client 600 comprises a processing unit 602 configured to interpret a reply message 605 received at a receiver 603 from the FCC server. The reply message 605 may comprise an IP redirect command, where the client is informed which multicast IP address it should join in order to receive the requested channel. The IP address may be a dedicated IP-address for the requested channel or selected from a pool of IP addresses, wherein on each IP address a certain time shifted copy of the requested channel is transmitted.

FIG. 1a illustrates the scenario when the selected source is the streaming server providing the media via regular multicast streaming. This source is selected when the load is detected to be high.

Figure 1B:
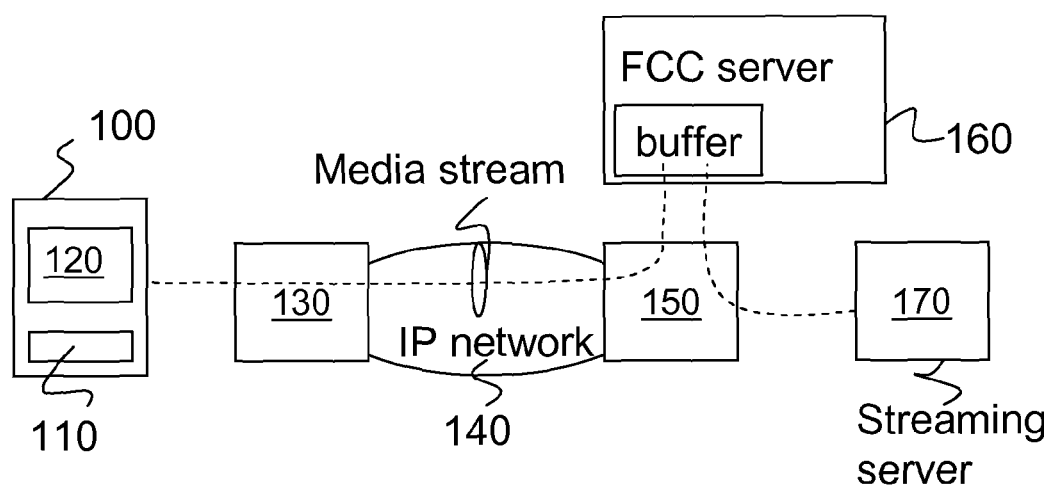
Figure 1C:
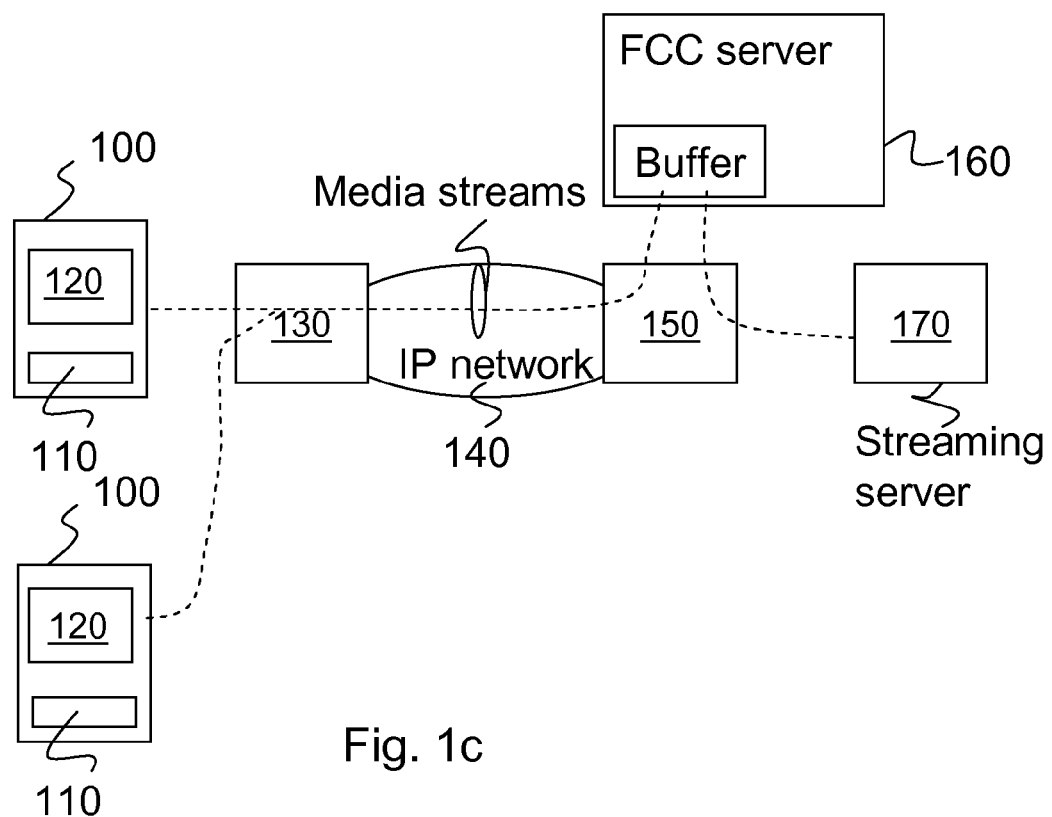

Turning now to FIGS. 1b and 1c illustrating a scenario when the selected source is the buffer associated with the FCC server. The buffer may be located in the FCC server or in a separate node in connection with the FCC server. The buffered TV channels may be sent to the client via unicast or multicast. The decision to select unicast or multicast is done individually for each request and may be dependent on the load of the FCC server. FIG. 1b illustrates the case when the buffered TV channel is transmitted via unicast and FIG. 1c illustrates the case when the buffered TV channel is transmitted via multicast. These two alternatives are further described below in conjunction with FIGS. 2a, 2b and 3.

Figure 2A:
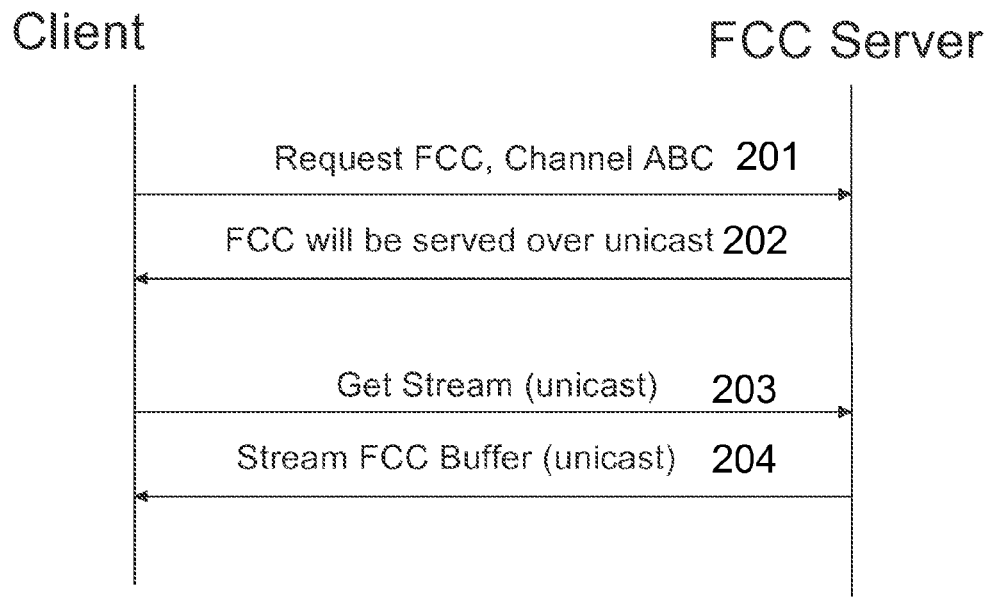
FIGS. 2a, 2b and 3 are sequence diagrams of embodiments of the present invention.
Figure 2B:
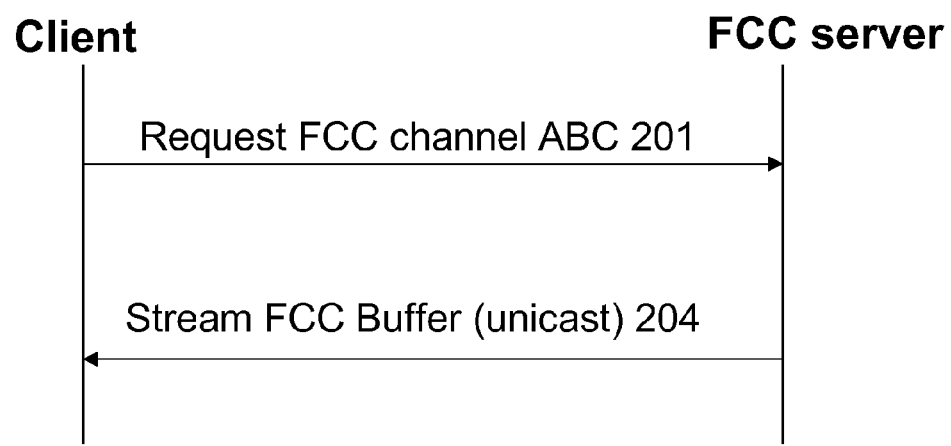

In low load situations there may be enough resources to send the requested TV channel via unicast. When the FCC server has determined that the FCC server is subject to a low load, e.g. that a few number of channel requests are received, it can start streaming the buffered content directly to the client after the message Request FCC is received at the FCC server as illustrated in FIG. 2b. Alternatively, it can a send a message to the client comprising an address to the buffer associated with the FCC server as illustrated in FIG. 2a. Examples of pre-conditions for determining the load situations include available memory in the FCC-server, available bandwidth on the FCC-server, number of clients being served, etc. It should be noted that the same buffer may be used for transmitting the buffered media both by unicast and the assigned multicast. Assigned multicast implies in this specification a multicast transmission of the buffered version of the media stream from the buffer associated with the FCC server. For example, the buffer can be serving one client with a unicast stream and from the same buffer start sending content as a multicast stream to other clients.

The unicast scenario in low load situations is illustrated in the sequence diagram of FIG. 2a. The client sends 201 a channel change request to the FCC server. The FCC server determines that it is subject to a low load situation and the channel change will be served over unicast. The FCC server sends 202 a message to the client comprising the address to the node providing the unicast transmission, e.g. the buffer of the FCC server in this case. The client interprets the message and requests 203 accordingly the media stream from the buffer of the FCC server indicated in the received message. The requested media is distributed 204 from the buffer of the FCC server to the client until the buffer is emptied, then the media stream from the buffer is synchronized with the regular multicast stream from the streaming server. When the synchronization is complete, the client leaves the unicast stream to join the regular multicast stream sent from the streaming server.

If the load is somewhat higher than in the previous scenario or an indication is received that the load is about to increase, a further strategy is introduced according to an embodiment of the present invention.

The basic idea of the above mentioned strategy is to group requests for the same channel by replying with a multicast address that will be shared among all clients requesting a particular channel during a certain (small) time window as explained above. Each client will now interpret the reply to join this multicast channel and wait for the stream. When the time window has passed the FCC server will start sending the buffered content. The time window will start when the first request is received for the particular channel provided that it is determined that the FCC server load is high enough or that in indication is received that the FCC server load is increasing. As several clients now share the same multicast stream the bandwidth requirement will decrease with the number of clients sharing the multicast stream. This strategy is referred to as assigned multicast in contrast to the regular multicast.

The client 100 is the entity making requests for channel change. The client can be the STB itself, the RGW or DSLAM. E.g., an IGMP-proxy extended with functionality of communicating with the FCC server, e.g. having the capability of requesting fast channel change from the FCC server and being able to interpret messages from the FCC server and to act accordingly. The extended functionality may also imply synchronization from an assigned multicast to the regular multicast. In the case of the IGMP-proxy, the STB does not need to be able to handle any FCC server handling, instead all FFC handling may be handled by the extended IGMP-proxy.

Figure 3:
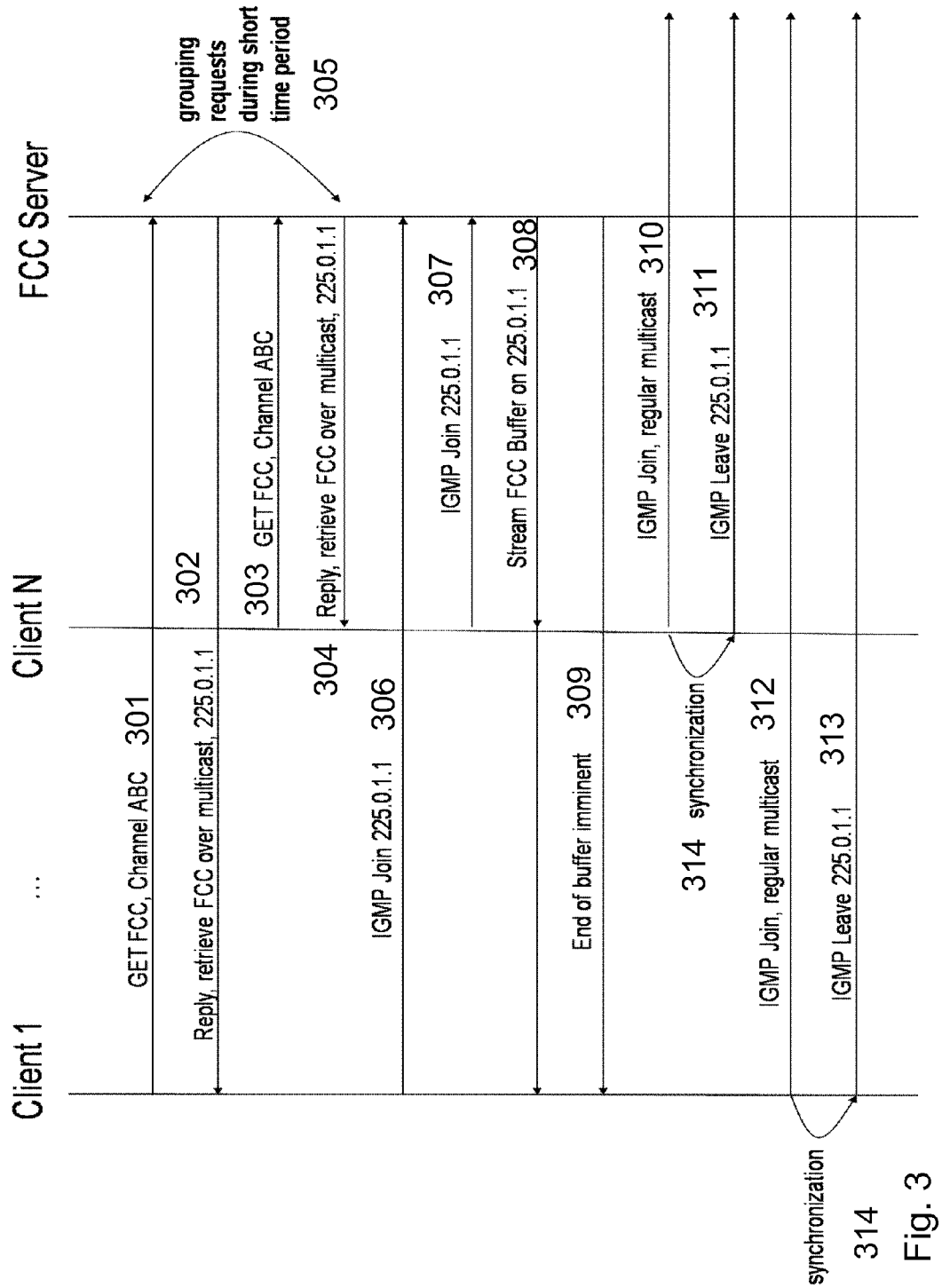

FIG. 3 is a sequence diagram illustrating the grouping of the requests when the FCC server load is above a certain threshold according to embodiments of the present invention. Multiple clients, e.g. client 1 and client N send channel change requests 301, 303 for a particular channel denoted "ABC" to the FCC server. These channel change requests correspond to the request denoted 604 in FIG. 6. In response to each of the received requests, the FCC server responds 302, 304 to the clients that the channel change will be served over multicast 225.0.1.1, which will be a multicast transmission from the buffer of the FCC server. It should also be noted that the responds 302, 304 corresponds to the reply message denoted 605 in FIG. 6. The channel change requests 301 and 303 can be grouped 305 together since the same channel is requested implying that they can chare the same assigned multicast stream. When the clients have received the response and interpreted the response that it should be redirected to the multicast address, they send an IGMP REPORT command (hereafter called for simplicity a JOIN command) 306, 307 to that multicast address. In the case illustrated in FIG. 3, the multicast address 225.0.0.1 has the FCC server as its source, since the buffered media stream is distributed from a buffer of the FCC server. In order to achieve a scalable solution, i.e. to be able to group more requests of the same channel, the FCC server waits a predetermined time period 330 until it sends 308 the requested media over the assigned multicast according to an embodiment of the present invention. In order to be able to wait the predetermined time period, a timer may be started when the first channel request 301 is received provided that it is determined that the FCC server load is above the certain threshold.

For example, all the requests for a certain channel coming in a time period of 50 ms, or significantly less than the GOP-length, e.g. for channel "ABC" will be grouped together. The clients will receive a message from the FCC Server indicating the multicast channel that will be used for delivery of content. All the clients will have to do is to join that multicast channel and wait for the reception of the content. If the load increases on the FCC server it can adopt a scheme that will increase the time window linearly with increasing load.

The multicast streams to the respective clients are then individually synchronized towards the regular multicast stream when the buffer is empty 309. When synchronization 314 is achieved the client leaves 311, 313 the assigned multicast and joins 310, 312 the regular multicast.

When the load is very high, that is, the available bandwidth on the FCC server is low the server will reply to the client telling it to use the regular multicast stream as illustrated in FIG. 1a. There will be no additional burden on the FCC server or the bandwidth. The channel switching time experienced by the client will now be the same as in a system without FCC functionality.

Hence, the present invention provides a solution for handling requests for new channels according to the current load of the FCC server. If load of the FCC server is low the requests may be served individually by unicast. However, when the load in the server starts to increase or if the load is above a certain threshold, a new mode of operation is introduced. In that mode of operation the client requests will be grouped together and they will be treated as a group. When the requests are grouped they can be served over a uniquely assigned multicast which is much more scalable than several unicast connections.

Figure 5A:
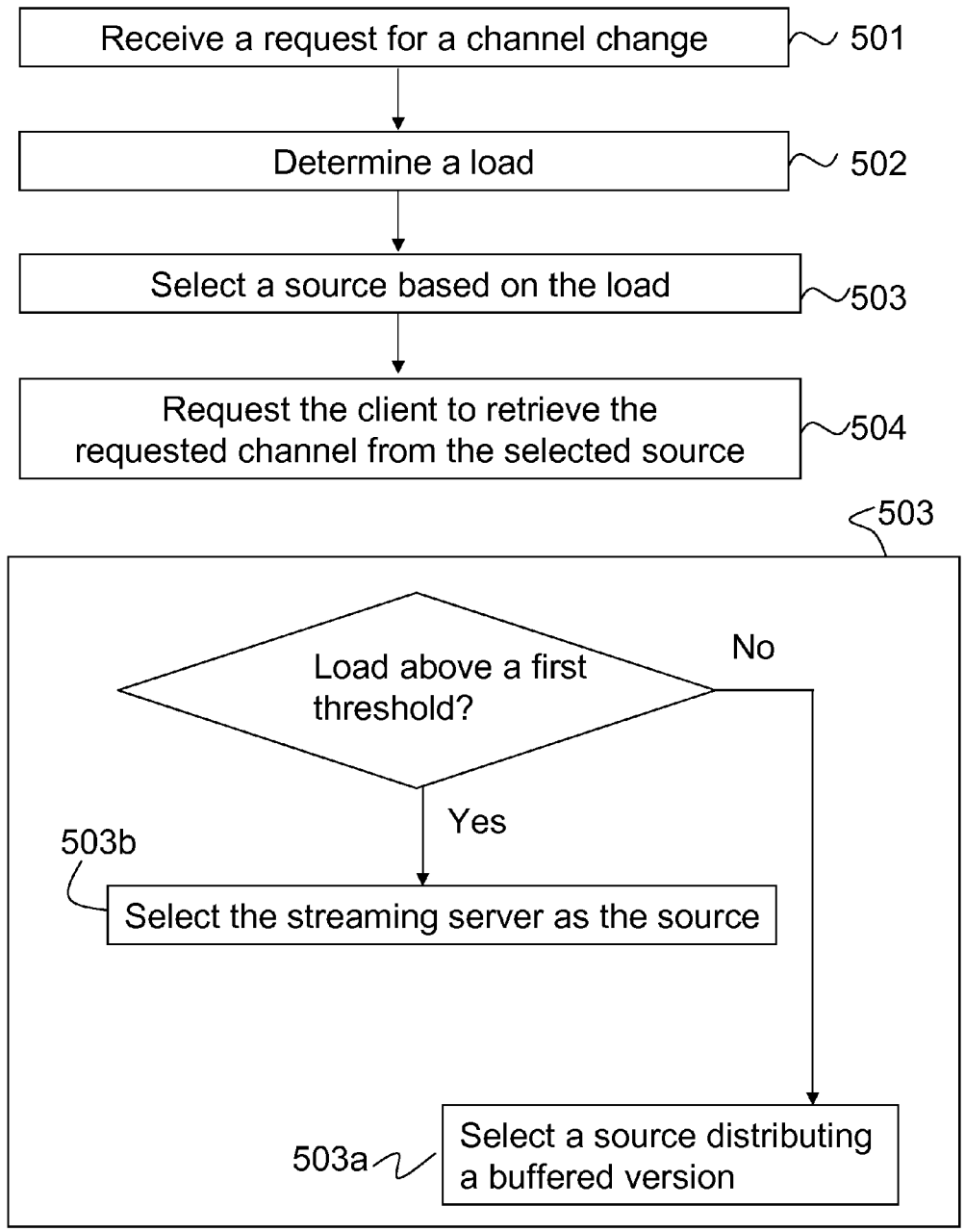
FIGS. 5a and 5b are flowcharts of the method in the FCC server according to embodiments of the present invention and FIG. 5c illustrates the relation between the thresholds and the FCC server load according to the embodiments of the invention.
Figure 5B:
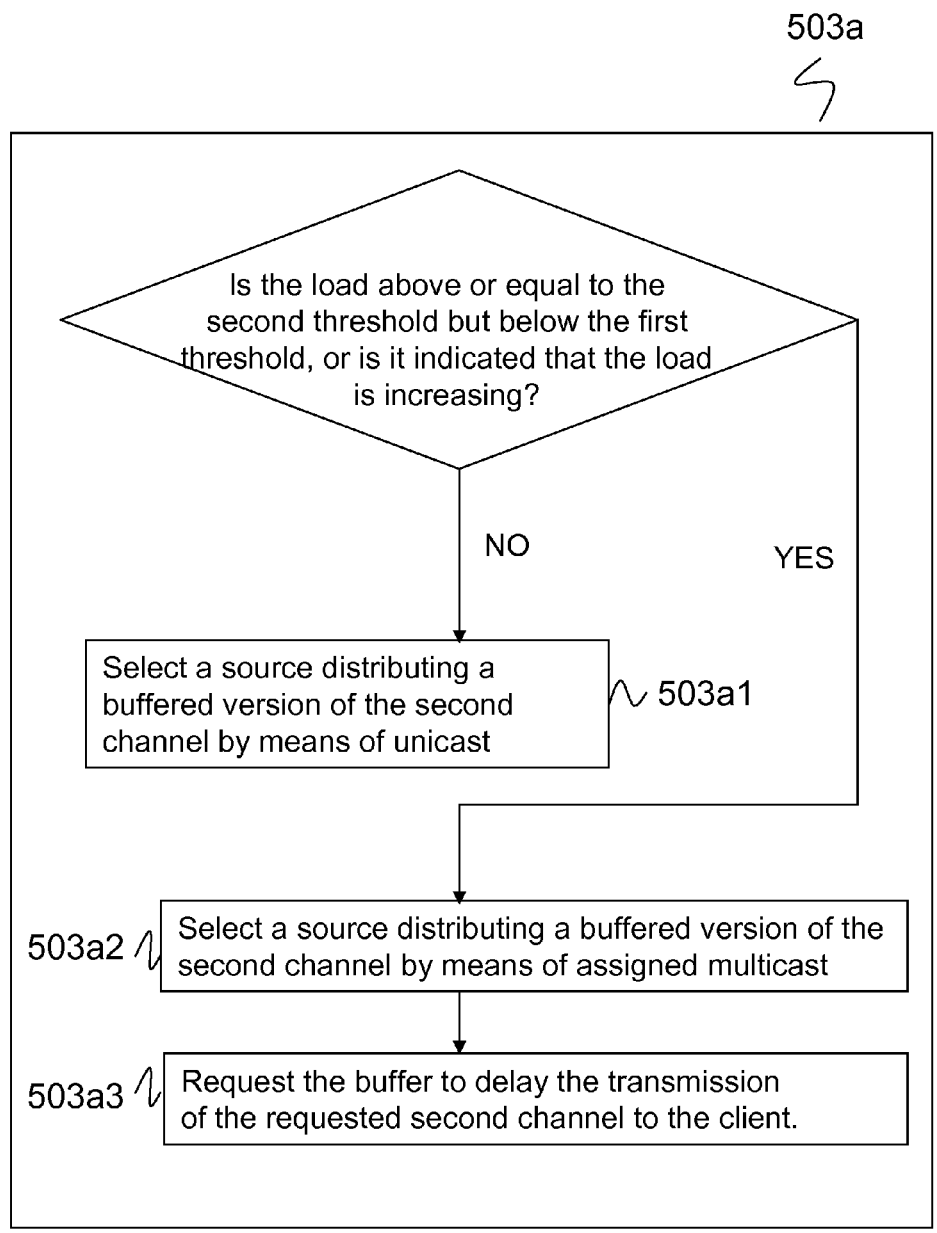

Methods of the embodiments of the present invention are illustrated by the flowcharts of FIGS. 5a, 5b and 6.

According to a first aspect, the method is to be implemented in a FCC server for handling channel change of channels distributing media transmitted via multicast distribution from a streaming server. The method comprises the steps of:
501. Receive a request for a channel change from a client from a first channel to a second channel.
502. Determine a load associated with the FCC server.
503. Select a source for retrieving the second channel based on the determined load.
504. Send a reply message to retrieve the second channel from the selected source.

According to an embodiment, the step of select a source 503 comprises the further steps of:
503a. Select a source distributing a buffered version of the second channel (either by unicast or assigned multicast) if the determined load is below a first predetermined threshold, also referred to as a high threshold.
503b. Select the streaming server as the source for distributing the second channel via the multicast distribution if the determined load is equal to or above the high threshold.

Furthermore, as indicated above, the buffered version of the second channel may be transmitted either via unicast or assigned multicast depending on the load of the FCC server. Hence, the following steps may be performed:
503a1. Select a source distributing a buffered version of the second channel by means of unicast from a buffer associated with the FCC server if the determined load is below a second predetermined threshold, also referred to as a low threshold.
503a2. Select a source distributing a buffered version of the second channel by means of multicast from a buffer associated with the FCC server if the determined load is above or equal to the low threshold but below the high threshold, or if it is indicated that the load is increasing. In addition, the buffer is requested to delay the transmission of the requested second channel to the client a predetermined time in order to be able to group further requests of the same channel.

Figure 7:
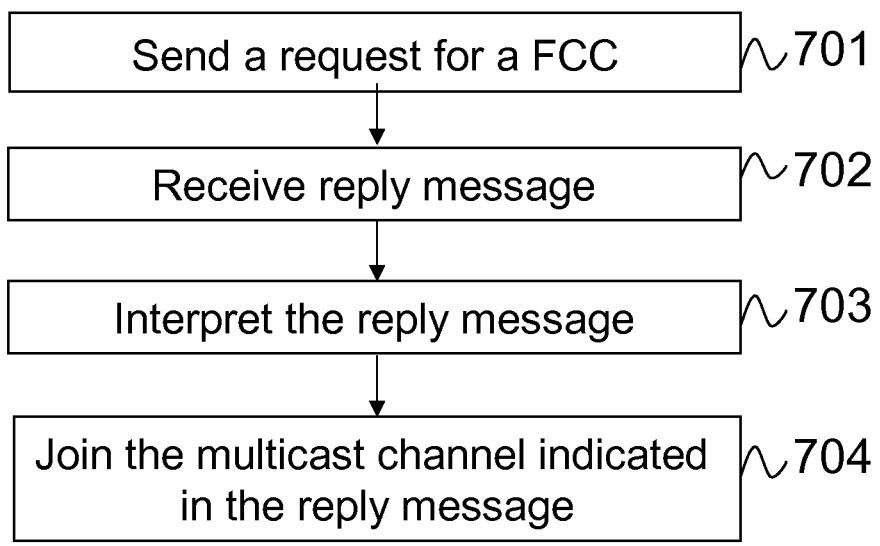
FIG. 7 is a flowchart of the method in the client according to embodiments of the present invention.

According to a second aspect, the method is to be implemented in the client according to the flowchart of FIG. 7.

The method comprises the steps of:

701. Send a request for a channel change from a first channel to a second channel to a FCC server.
702. Receive a reply message from the FCC server.
703. Interpret the reply message to be able to receive information of the source where to receive the requested second channel, wherein the source is selected by the FCC server in dependence of the load.

As stated above, the reply message may be interpreted to comprise a re-direct command to a multicast address, and the method comprises the further step of:
704. Join the multicast address indicated in the re-direct command.

Figure 5C:
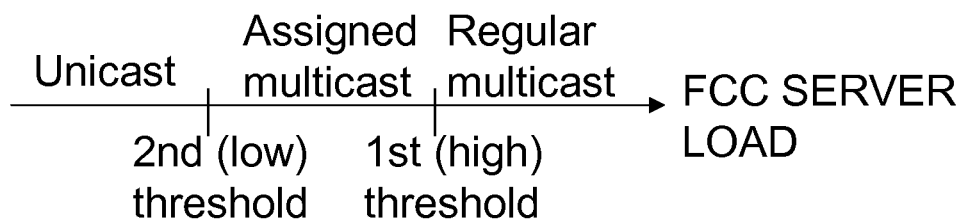

The relation between the first (high) threshold, the second (low) threshold and the FCC server load is schematically illustrated in the diagram in FIG. 5c. It shows that unicast is used below the second (low) threshold, assigned multicast is used above the second (low) threshold but below the first (high) threshold, and the regular multicast is used above the first (high) threshold. Hence, the buffered streams are used below the first (high) threshold.

It should be noted that in situations when the FCC server cannot handle the incoming control messages (i.e. request messages) a timeout mechanisms can be used in the client. The client will join the regular multicast channel if a timeout occurs thereby offloading the FCC server.

Although the buffer buffering the media streams starting with an I-frame is located in the FCC server, it would be appreciated that the buffer also can be located in another node connected to the FCC server. The FCC server will then respond in e.g. a re-direct message to the clients to retrieve the buffered media from that node and include an address pointing to that node in the response to the channel change request.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a fast channel change, FCC, server for handling channel change of channels distributing media transmitted via multicast distribution from a streaming server, comprising the steps of:
   receiving from a client a request for a channel change from a first channel to a second channel, wherein the first channel carries a first media stream and the second channel carries a second media stream containing different media than the first media stream;
   determining a load associated with the FCC server;
   comparing the load to a first threshold and a second threshold;
   in response to the load being above the second threshold but below the first threshold, selecting a first source as a selected source for assigned multicast distribution of a buffered version of the second channel by multicast from a buffer associated with the FCC server;
   in response to the load being above the first threshold, selecting a second source as the selected source for multicast distribution of the second channel;
   in response to the load being below the second threshold, selecting a unicast source as the selected source for unicast distribution of a buffered version of the second channel by unicast from a buffer associated with the FCC server;
   sending a reply to the request that requests distribution of the second channel from the selected source; and
   in response to the selected source being the first source, controlling the buffer of the first source to delay distribution of the buffered version of the second channel to the client a predetermined time, and further responsive to receiving other requests for the second channel from other clients during the predetermined time, associating the client and the other clients with a multicast address to receive the assigned multicast distribution of the buffered version of the second channel.

2. The method according to claim 1, wherein the load is determined based on the number of received channel change requests.

3. The method according to claim 1, wherein the load is determined based on the available bandwidth of the FCC server.

4. A fast channel change, FCC, server for handling channel change of channels distributing media transmitted via multicast distribution from a streaming server, the FCC server comprising:
- a receiver configured to receive a request from a client for a channel change from a first channel to a second channel, wherein the first channel carries a first media stream and the second channel carries a second media stream containing different media than the first media stream;
- a processor configured to:
  - determine a load associated with the FCC server;
  - compare the load to a first threshold and a second threshold;
  - in response to the load being above the second threshold but below the first threshold, select a first source as a selected source for assigned multicast distribution of a buffered version of the second channel by multicast from a buffer associated with the FCC server;
  - in response to the load being above the first threshold, select a second source as the selected source for multicast distribution of the second channel; and
  - in response to the load being below the second threshold, select a unicast source as the selected source for unicast distribution of a buffered version of the second channel by unicast from a buffer associated with the FCC server;
- a transmitter configured to send a reply to the request that requests distribution of the second channel from the selected source; and
- in response to the selected source being the first source, the processor is further configured to control the buffer of the first source to delay transmission of the buffered version of the second channel to the client a predetermined time, and further responsive to receiving from other clients other requests for the second channel during the predetermined time, the processor is further configured to associate the client and the other clients with a multicast address to receive the assigned multicast distribution of the buffered version of the second channel.

5. The FCC server according to claim 4, wherein the load is determined based on the number of received channel change requests.

6. The FCC server according to claim 4, wherein the load is determined based on the available bandwidth of the FCC server.

\* \* \* \* \*